United States Patent [19]

Holmes et al.

[11] 4,121,383
[45] Oct. 24, 1978

[54] CLOSURE MECHANISM FOR A DOOR

[75] Inventors: Billy H. Holmes; John B. Schwartz, both of Lake Park, Fla.

[73] Assignee: Perry Oceanographics, Inc., Riviera Beach, Fla.

[21] Appl. No.: 814,675

[22] Filed: Jul. 11, 1977

[51] Int. Cl.$^2$ .............................................. E05C 9/06
[52] U.S. Cl. .................................... 49/395; 220/325; 292/6
[58] Field of Search ...................... 49/395; 292/6, 43; 220/315, 325

[56] References Cited

U.S. PATENT DOCUMENTS

| 3,209,663 | 10/1965 | Baler | 49/395 |
| 3,261,627 | 7/1966 | Wallden | 220/315 X |
| 3,435,794 | 4/1969 | Pechacek | 49/395 X |

Primary Examiner—Kenneth Downey
Attorney, Agent, or Firm—Spencer & Kaye

[57] ABSTRACT

A mechanism for securing a dome-shaped door in an opening of a vessel to effect sealing with respect to pressure at either side of the door, the convex side of the door being directed towards the exterior of the vessel and the mechanism being disposed at the concave side of the door and including locking members radially movable into a door locking position and a spider assembly connect to move the locking members and mounted for movement along a shaft carried by the door between a position in which the assembly is adjacent the door and the locking members are retracted from the door locking position and a position in which the assembly is spaced from the concave side of the door and the locking members are in the door locking position, whereby the mechanism can be retained substantially within the recess defined by the door at its concave side.

11 Claims, 1 Drawing Figure

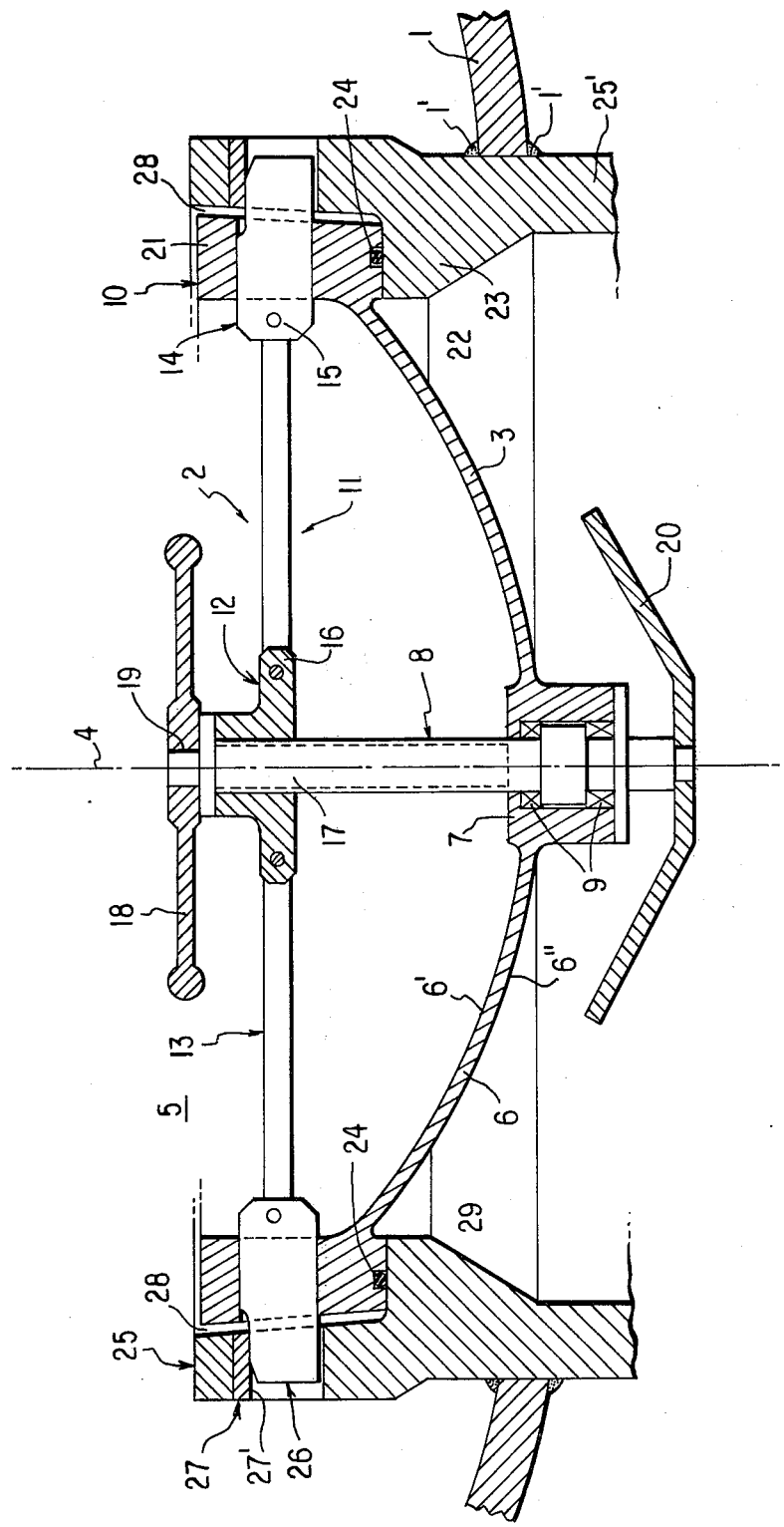

CLOSURE MECHANISM FOR A DOOR

BACKGROUND OF THE INVENTION

The present invention is directed to a door closure mechanism for securing a door in an opening provided in a wall of a vessel to seal the opening against pressure on either side of the door. The mechanism is particularly suitable for use on doors of undersea vessels.

Various door closure mechanisms have been devised for locking a door in an opening provided in vessels, tanks or chambers of various types in a manner which provides a pressure tight seal.

Vessels such as pressure chambers, retorts and the like, require seals which are designed to be outwardly effective, that is effective in the direction of from the inside to the outside of the vessel, while other vessels, such as vacuum chambers and the like, require seals that are inwardly effective, that is effective in the direction of from the outside to the inside of the vessel. In vessels useful in undersea manuevers, such as diving chambers, diver lock-out modules and other types of submersibles, the joint between the opening provided in the vessel wall and the door must be sealed against pressure exerted from either side of the door.

The various door closure mechanisms presently used to secure a door on a vessel wall opening, such as disclosed in U.S. Pat. Nos. 2,219,137 to Moon, 2,355,475 to Skaller and 2,447,464 to Jenkins are of complex design. Such as door is normally of a circular configuration to give it added strength and rigidity to withstand the various forces exerted thereon, has a convex side protruding into the interior of the vessel, and has a rotatable shaft axially mounted on it. The shaft extends outwardly beyond the boundary of the vessel walls to provide sufficient movement of a spider assembly connected to the shaft to effect locking and unlocking and may extend inwardly beyond the convex surface to permit opening and closing from within the vessel. To effect locking, the spider hub of the assembly is required to move towards the door body to thereby actuate a series of lever arms or a series of combinations of lever arms to outwardly extend a locking device located at the junction of the periphery of the door and the vessel wall. The spider assembly may be designed with a series of lever arms attached to the hub, such as by a ball and socket arrangement, in a manner such that relative rotation between the hub and the shaft forces the levers to slide through a series of guides and mountings to engage keeper bars mounted on the vessel wall.

The known closure mechanisms have the drawback of being of a fairly complex design and requiring space outside of the boundaries of the vessel walls for movement of the hub. In the case of undersea operations such protrusions beyond the vessel wall boundary create hazards in that such protrusions can entangle the vessel's life support umbilical cords and the like.

Further, known closure mechanisms present a hazard to the occupants within the chamber of the vessel by the protrusion of the door and the shaft into the chamber.

Still further, the known complex mechanisms ar susceptible to breakdown and malfunctioning which may abort the mission for which the vessel was intended.

SUMMARY OF THE INVENTION

It is therefore an object of the present invention to provide an improved door closure mechanism, especially suitable for undersea vessels, which is substantially contained within the envelope of the door and within the boundary defined by the vessel wall, which has a simple design with few moving parts, making it less susceptible to breakdown and malfunction, and which has a high mechanical advantage.

These and other objects are accomplished by the present door closure mechanism which is able to secure a door in an opening provided in a wall of a vessel to seal the opening against pressure in both directions, the door having a dished configuration which is concave toward the inside of the vessel and having a shaft mounted thereon which extends axially of the opening and projects inwardly away from the concave side of the door and having a spider assembly which has locking members disposed around the periphery of the door movable into a position for locking the door to the opening, lever arms each having one end connected to a locking member and the other end connected to a spider hub which is mounted on and coacts with the axial shaft such that when the hub is adjacent to the door the lever arms and locking members are retracted inwardly to a door unlocking position and when the hub is away from the door the lever arms and locking members are extended radially outwardly in locking position, the shaft having a device, such as a wheel connected to the shaft, for rotating the shaft to cause the hub to move axially thereon.

Further, the door can be circular with the lever arms extending radially substantially the radius of the door. Further the vessel wall has around the opening provided therein, a collar member which presents a surface radially extending and facing towards the interior of the vessel. The door has, around its periphery, a peripheral member which presents a surface radially extending in facing arrangement with the surface of the collar member and facing away from the interior of the vessel. One of these members has a sealing member connected thereto for sealing the door to the vessel wall.

In further accordance with the present invention, the peripheral member is provided with radially extending holes and the collar member is provided with radially extending holes in facing arrangement with the holes of the peripheral member. The locking members extend only into the holes of the peripheral member when the hub of the spider assembly is positioned close to the door. The locking members extend through the peripheral member holes and into the collar member holes when the hub of the spider is positioned away from the door.

BRIEF DESCRIPTION OF THE DRAWING

The single FIGURE is broken away, cross-sectional view of a door of dished configuration provided with one preferred embodiment of the closure mechanism according to the present invention.

DESCRIPTION OF THE PREFERRED EMBODIMENTS

The present invention will now be described in detail with reference to the preferred embodiment illustrated in the FIGURE, which shows a vessel whose walls 1 are provided with an opening 2 arranged to be closed and sealed by a door 3. The vessel walls 1 may extend substantially perpendicular to the axis of opening 2, by curved to form a spherical element or may be oriented in any other direction suitable to conform to the design needs of the vessel.

The door 3 has a dished, or dome-shaped, configuration which is concave toward the inside of the vessel chamber 5 and the closure mechanism is substantially contained within the recess defined by door 3 at its concave side. The door 3 is normally made of heavy metal plate and is circular. One edge of door 3 is provided with a hinge of any standard construction (not shown) to swing door 3 between closed and open positions.

The dished configuration of the door is defined by the shape of formed plate 6 to present a concave surface 6' facing toward chamber 5 and a convex surface 6" facing away from chamber 5. At the center of plate 6 is a mounting member 7 for mounting a threaded shaft 8 to the door. The mounting member can be in the form of a support for mounting shaft 8 to extend, when the door is closed, along the axis 4 of the opening 2 so as to project inwardly away from the concave surface 6' of the door. The mounting member 7 can, as illustrated in the FIGURE, be a bushing member provided with accompanying sealing member 9 for permitting shaft 8 to extend through door 3 in a sealing manner so as to also extend axially outwardly to permit opening of the door from the exterior of the vessel.

On shaft 8 is mounted a spider assembly 11 composed of a spider hub 12, lever arms 13, and locking members 14. Each of the locking members 14 is located at the periphery of the door 3 and is capable of moving radially outwardly and inwardly to lock and unlock, respectively, door 3 to the vessel wall 1. Locking members 14 are each, respectively, connected to one end of a lever arm 13 by a pin 15. The opposite end of each of the lever arms 13 is connected to the spider hub by a pin 16. Pins 15 and 16 connect the members in a manner which permits free movement of the members of the spider assembly 11 in response to the axial movement of hub 12 on shaft 8.

When the spider hub 12 moves inwardly towards the concave surface 6' and into the envelope of door 3 it causes lever arm 13 and locking member 14 to retract radially inwardly and cause locking member 14 to move into the door unlocking position. When the spider hub 12, on the other hand, is caused to move outwardly, the lever arms 13 and locking members 14 move radially outwardly, causing locking members 14 to move into the door locking position.

The spider hub 12 has an axial hole 17 which is threaded to coact with the threaded shaft 8 in a manner that the rotation of the shaft 8 causes axial movement of hub 12. Handle 18 is connected by nut 19 to that end of shaft 8 which is farthest away from the door to permit rotation of the shaft. The rotation can also be accomplished by other conventional means, such as an electric motor.

If shaft 8 extends (as illustrated) through mounting member 7 to the exterior of the vessel, the shaft carries a further handle 20 located on the shaft to rotate the shaft 8 from outside of the vessel.

The door 3 has a peripheral member 10 located at the periphery of plate 6. Peripheral member 10 has distributed around its circumference a series of holes 21 radially extending through the member 10 within which locking members 14 seat. Further, the peripheral member 10 provides a radially extending surface 22 which faces away from the interior chamber 5 of the vessel.

The vessel wall 1 has a collar member 25 surrounding opening 2. The collar member 25 is connected to the vessel wall 1 by weldments 1'. Extension member 25' may extend outwardly away from the vessel wall 1 to conform to the design needs of the vessel. Distributed around the circumference of collar member 25 are radially extending holes 26 which are aligned with a respective hole 21 of peripheral member 10.

A bearing member 27 in each hole 26 has a bearing surface 27' facing toward the exterior of the vessel. Members 27 may be an integral part of each of the holes 26 or may be separate members of suitable wear-resistant material connected therein.

Collar member 25 also has a surface 29 facing towards chamber 5 which radially extends towards the center of opening 2 and which is in facing relationship with surface 22 of peripheral member 10 when the door is closed.

Between surface 22 and surface 29 is a sealing member for establishing a pressure-tight seal between members 10 and 25, and hence between the door and the vessel wall. The FIGURE illustrates the sealing member connected to surface 22 in the form of an O-ring sealing member 23 of flexible material, such as rubber, which is partially housed in an annular groove 24 in surface 22.

The locking members 14 each have a tapered surface 28 which faces towards the interior chamber 5. When locking member 14 is in a locked position, the tapering surface 28 engages with bearing surface 27' of holes 26 to urge the door axially chamber 5 and thereby urge surfaces 22 and 29 into a locking engagement.

The force produced by the camming action of locking members 14 against surfaces 27' assures maintenance of a pressure tight seal against pressure exerted from outside of the vessel, while the relative positions of surfaces 22 and 29 assures that pressures exerted from within the vessel will act on door 3 in a direction to urge surface 22 against surface 29, thereby maintaining a pressure tight seal.

The present invention provides a locking and sealing mechanism which can be contained substantially within the envelope of the door and the region defined by the collar such that when the spider hub 12 is positioned close to the door plates 6 the locking members 14 are retracted inwardly via lever arms 13 and are not extending into holes 26. When the door 3 is closed and spider hub 12 is positioned away from plate 6 of door 3 the lever arms 13 are extended radially and, in turn, cause the locking members 14 to extend radially into holes 26 and against bearing surfaces 27 to lock the door in opening 2 in a sealing manner.

Because the door locking position of members 14 corresponds to the maximum separation of hub 12 from plate 6 and unlocking is effected by moving hub 12 toward plate 6, maximum advantage is taken of the recess presented at the concave side of door 3 and the door locking mechanism need not protrude inwardly beyond that recess.

The door closure mechanism may, alternately, be orientated in an opposite direction with respect to the chamber from that described hereinabove. The dished configuration of the door, thus, presents a concave surface away from the vessel chamber and a convex surface facing toward the chamber. The door closure mechanism of the door orientated in this manner has a reduced amount of protrusions than presented by conventional door closures presently in use.

It is understood that the above description of the present invention is susceptible to various modifications, changes and adaptations, and the same are intended to be comprehended within the meaning and range of equivalents of the appended claims.

What is claimed is:

1. In combination with a door mounted in an opening provided in a wall of a vessel to seal the opening against pressure on either side of the door, the door having a dished configuration which is concave toward the inside of the vessel and being provided with a shaft extending axially of the opening when the door is closed and projecting inwardly from the concave side of the door, a door closure mechanism located substantially within the recess defined by the door at its concave side for securing the door in the opening, comprising:

locking members disposed around the periphery of said door and movable into a position for locking said door to the opening;

lever arms each having first and second ends, the first end of each said lever arm being connected to a respective one of said locking members;

a spider hub mounted on and coacting with said axial shaft and connected to the second end of each of said lever arms for retracting said lever arms and locking members inwardly from the door locking position of said members when said hub is adjacent to said door and for extending said arms and members outwardly into the locking position of said members when said hub is away from said door; and means for moving said hub axially on said shaft.

2. An arrangement as defined in claim 1 wherein said door is circular and each of said lever arms extend substantially along a radius of said door.

3. An arrangement as defined in claim 2 further comprising a collar member forming part of the vessel wall and surrounding said opening, said collar member presenting a surface extending radially toward the center of said opening and facing towards the interior of the vessel; and wherein said door is provided with a peripheral member extending around its periphery, said peripheral member presenting a radially extending surface facing away from the interior of the vessel and in mutual facing arrangement with said surface of said collar member when said door is closed; and further comprising sealing means disposed between said surfaces when said door is closed for pressure sealing said door to the vessel wall.

4. An arrangement as defined in claim 3 wherein one of said surfaces is provided with an annular groove and said sealing means comprises a flexible O-ring gasket mounted in said groove.

5. An arrangement as defined in claim 3 wherein said collar member is provided with radially extending holes distributed around its circumference each of said holes presenting a bearing surface facing away from the interior of the vessel for engagement with a respective locking member when said door is closed, to effect locking of said door to the opening.

6. An arrangement as defined in claim 3 wherein each said locking member is provided with a tapered surface facing towards the interior of the vessel and engageable with said bearing surface of a respective hole for urging said radially extending surfaces of said collar member and peripheral member toward one another during movement of said locking members into their locking position.

7. An arrangement as defined in claim 6 wherein said locking members are clear of said holes when said spider hub is positioned adjacent to said door and project into said holes when said door is closed and said spider hub is positioned away from said door.

8. An arrangement as defined in claim 6 wherein said shaft is dimensioned such that, when said door is closed, the end of said shaft remote from said door is substantially within the region enclosed by said collar member.

9. An arrangement as defined in claim 6 wherein said peripheral member is provided with radially extending holes aligned with said holes in said collar member when said door is closed and arranged for guiding said locking members.

10. An arrangement as defined in claim 1 further comprising: a bushing mounted in said door and supporting said shaft for rotation about its axis, said shaft extending through said door; and means connected to the end of said shaft which projects from the convex side of said door for rotating said shaft in order to move said hub axially along said shaft.

11. In combination with a door mounted in an opening provided in a wall of a vessel to seal the opening against pressure on either side of the door, the door having a dished configuration and being provided with a shaft extending axially of the opening when the door is closed and projecting away from the concave surface side of the door, a door closure mechanism located substantially within the recess defined by the door at its concave side for securing the door in the opening, comprising:

locking members disposed around the periphery of said door and movable into a position for locking said door to the opening;

lever arms each having first and second ends, the first end of each said lever arm being connected to a respective one of said locking members;

a spider hub mounted on and coacting with said axial shaft and connected to the second end of each of said lever arms for retracting said lever arms and locking members inwardly from the door locking position of said members when said hub is adjacent to said door and for extending said arms and members outwardly into the locking position of said members when said hub is away from said door; and means for moving said hub axially on said shaft.

* * * * *